(12) United States Patent
Farley et al.

(10) Patent No.: US 8,146,231 B2
(45) Date of Patent: Apr. 3, 2012

(54) INSERTION TOOL FOR A ROTARY CHOPPER ELEMENT OF AN INTEGRAL CHOPPER ASSEMBLY OF A COMBINE HARVESTER

(75) Inventors: Herbert M. Farley, Elizabethtown, PA (US); Jason M. Benes, Mount Joy, PA (US); Daniel J. Klein, Milwaukee, WI (US); Bradley J. Wagner, Orrtanna, PA (US)

(73) Assignee: CNH America LLC, New Holland, PA (US)

( * ) Notice: Subject to any disclaimer, the term of this patent is extended or adjusted under 35 U.S.C. 154(b) by 985 days.

(21) Appl. No.: 12/154,609

(22) Filed: May 23, 2008

(65) Prior Publication Data

US 2008/0293463 A1 Nov. 27, 2008

Related U.S. Application Data

(60) Provisional application No. 60/931,418, filed on May 23, 2007.

(51) Int. Cl.
*B23Q 3/00* (2006.01)
*B25B 27/14* (2006.01)

(52) U.S. Cl. ...... 29/464; 29/468; 29/888.011; 29/281.1; 29/281.4; 254/2 R; 414/591; 414/589

(58) Field of Classification Search ............ 29/888.011, 29/464, 281.1, 281.4, 468; 254/2 R, 89 R; 414/589, 591; 460/109, 104, 59
See application file for complete search history.

(56) References Cited

U.S. PATENT DOCUMENTS

| | | | | |
|---|---|---|---|---|
| 2,431,589 | A | 11/1947 | Schuler, Jr. | 214/1 |
| 2,686,523 | A | 8/1954 | Young | 130/27 |
| 2,743,728 | A | 5/1956 | Carlson | 130/27 |
| 2,931,519 | A * | 4/1960 | Beach | 414/589 |
| 3,283,933 | A | 11/1966 | Vander Wal | 214/620 |
| 3,957,058 | A | 5/1976 | Komancheck | 130/27 J |
| 4,412,774 | A * | 11/1983 | Legrand et al. | 414/589 |
| 4,440,265 | A * | 4/1984 | Spagnoli | 182/129 |
| 4,461,455 | A * | 7/1984 | Mills et al. | 254/3 R |
| 4,660,796 | A * | 4/1987 | Garrec | 248/544 |
| 5,383,758 | A | 1/1995 | Patrick | 414/680 |
| 5,486,083 | A | 1/1996 | Thompson | 414/607 |
| 5,575,608 | A | 11/1996 | Yau et al. | 414/607 |
| 5,655,873 | A | 8/1997 | Jobmann et al. | 414/607 |
| 5,692,583 | A | 12/1997 | Reed et al. | 187/237 |
| 5,722,512 | A * | 3/1998 | Lilja et al. | 187/244 |
| 6,170,141 | B1 * | 1/2001 | Rossway et al. | 29/281.1 |
| 6,292,999 | B1 * | 9/2001 | Rossway et al. | 29/559 |
| 6,758,745 | B2 | 7/2004 | Van Der Haegen et al. | 460/109 |
| 7,103,952 | B2 * | 9/2006 | Appleton et al. | 29/281.4 |
| 7,228,611 | B2 * | 6/2007 | Anderson et al. | 29/448 |
| 7,347,409 | B2 * | 3/2008 | Goza | 254/2 B |

FOREIGN PATENT DOCUMENTS

JP 11192015 7/1999

* cited by examiner

*Primary Examiner* — Essama Omgba
(74) *Attorney, Agent, or Firm* — Michael G. Harms

(57) ABSTRACT

An insertion tool for installing rotary chopper elements in integral chopper assemblies in combine harvesters, which insertion tool includes an elongated open-ended trough-like bed portion of a length, breadth, and depth to sufficiently accommodate the rotary chopper element therewithin, with lift brackets along the sides thereof configured to accommodate the prongs of lifting forks of a forklift. The rotary chopper element may be positioned to rest within the bed portion of the insertion tool for transport to adjacent to the access and installation window of a harvester and for slidable insertion by the insertion tool through such window for installation within the harvester.

23 Claims, 6 Drawing Sheets

INSERTION TOOL FOR A ROTARY CHOPPER ELEMENT OF AN INTEGRAL CHOPPER ASSEMBLY OF A COMBINE HARVESTER

This application claims the benefit of U.S. Provisional Application No. 60/931,418, filed May 23, 2007.

TECHNICAL FIELD

This invention relates generally to agricultural harvesting combines and machines and to straw and residue chopping systems therewith, especially integral chopper assemblies that utilize a rotary chopper element or portion, and more particularly to an insertion tool for positioning and inserting a rotary chopper element of an integral chopper assembly through an access and installation window of a combine harvester.

BACKGROUND ART

In the operation of a typical agricultural combine that employs a threshing rotor, the flow of crop residue, sometimes referred to as material other than grain (MOG), remaining after threshing is typically discharged into a crop residue treatment and distribution system for treatment thereby and for ultimate distribution onto or over a field. Straw and residue chopper assemblies and residue spreader assemblies of various types and constructions have long been in use in or with such residue treatment and distribution systems. Such assemblies have operated to chop or pulverize the crop residue resulting from a harvesting operation into finer pieces and/or to spread the resulting crop residue, whether chopped into finer pieces by operation of a chopper assembly or passed to the spreader assembly as larger pieces of residue, onto and over the field. While such chopper and residue spreader assemblies have taken various forms, depending upon the desires of users and manufacturers, they may sometimes be identified as being of certain general types.

Many typical harvesters have traditionally employed technology and methods that have become associated with what is sometimes referred to as a hood mount chopper. Generally, such hood mount choppers can be described as flail choppers, and the systems of which they are a part have evolved to the point that they may include over 100 flail knives on a rotating chopper, mounted within a dedicated housing that provides an appropriate environment for the operation of the rotating chopper so as to best maximize its performance. The rotating chopper of such a residue management system may often operate at or above 3000 RPM and provide suitable and sufficient energy to the chopped material to be able to effect a spread of the chopped material over a width of up to 40 feet, which width generally corresponds to the cut width of the header. Such a residue management system is thus operable for its intended purpose of chopping and spreading the chopped material over a field, and generally operates effectively in such regard. With such a system, if a user does not desire to chop the straw, he may turn the chopper off and bypass, or route the material flow around, the chopper.

Typical Case IH harvesters, however, have, for over 25 years now, in an effort to provide greater equipment versatility while reducing equipment complexities, typically employed a somewhat different technology in the residue management systems thereof. Such alternative technology, the primary purpose of which has been the transport of material away from the threshing system, has utilized a multifaceted construction that affords greater versatility in the transport of such material in that such material can not only be transported, but can also be treated in varying manners dependent upon the desires of operators. Such constructions have come to be known as integral choppers or integral chopper or chopping systems due to the integration of a chopping function, in addition to the primary transport function, into the combine and its operations. Such integral chopper systems, because of their positioning within the combine and their functional capabilities, offer a versatility not generally available with the hood mounted chopper systems.

The more recent integral chopper systems have typically included a residue chopper assembly that has a rotary chopper component or element disposed laterally within a housing extending generally horizontally across the flow path of the crop residue through the housing, as well as a counter knife assembly extending generally parallel to and spaced from the rotary chopper element. The counter knife assembly has included a chopper grate assembly spaced below and extending generally parallel to the rotary chopper element and a knife mounting assembly positioned generally beneath the chopper grate assembly.

The rotary chopper element of the residue chopper assembly has typically included a cylindrical tube or like member having a plurality of mounting locations distributed about its periphery, at which locations various knife blades or paddles have been mounted or affixed. Oftentimes the mounting locations and the knife blades connected or mounted thereat have been disposed in rows and columns, though sometimes in differing array configurations, about the outer surface of the rotary member so that, as the rotary member has been operated, the knife blades have served to contact and pull and push rearwardly the residue material passing near the rotary member, sometimes also cutting such residue material into smaller pieces as the residue material has been propelled rearwardly.

In the operation of a typical combine that employs an integral chopper system, the flow of crop residue after threshing is typically discharged into a crop residue treatment and distribution system located below and rearwardly of the rear end of the threshing system, which crop residue treatment and distribution system includes the integral chopper system and its primary rotary chopper or beater apparatus or assembly that is operable to chop or beat the residue into smaller pieces as it transports and/or propels the resultant crop residue further rearwardly within a rear end of the combine for either discharge from the combine through a rear opening onto a field, or into another secondary chopper and/or spreader mounted on the rear end operable for spreading the residue over a swath of a field.

During a typical operation of such a combine, as the crop residue is discharged from the combine rotor and moves through the crop residue treatment and distribution system, it flows between the rotary chopper element of the integral chopper assembly and the chopper grate assembly thereof. When the stationary knife assembly is in an engaged position, as the crop residue is being moved and propelled rearwardly, such crop residue is also chopped into smaller pieces by the cooperative actions of the knife blades or elements of the stationary knife assembly and the knife blades or paddles on the rotating rotary chopper element. The rotational movement of the rotary chopper element, typically at or near 3000 RPM, thus serves not only to propel the resultant flow of crop residue further rearwardly, but also to effect a cutting of the material encountered by the knife blades or paddles associated therewith.

When the stationary knife assembly is positioned to a fully retracted position, however, such as might be desirable with some crops and/or for some residue, the crop residue passing between the rotary chopper element and the chopper grate assembly is moved rearwardly by the action of the rotary chopper element, but with greatly lessened chopping activity. Despite the recognized versatility and advantages of the integral chopper systems, attempts to improve such systems, as well as their installation and setup, have continued, fueled in part by customer critiques, demands, and desires In such regard, the position of the integral chopper assemblies within the combine harvesters has made installation of the rotary chopper element a challenging proposition. Typically, the rotary chopper element, which is relatively heavy and cumbersome, has had to be installed and/or removed through an access and installation window along the side of a combine harvester to extend generally across a significant portion of the width of the harvester. Because the engine, gearbox, and multiple hydraulic lines have typically been located more or less directly above the window used for such activity, installation and removal of the rotary chopper elements has remained a difficult procedure, in part because it has been difficult to suspend or support the rotary chopper element, and to move it into position or to withdraw it through such access and installation window, during the process of installation or removal. Often, installation was effected by suspending the rotary chopper element to position it adjacent to the access and installation window and then working the rotary chopper element through the access and installation window and into position for appropriate securement within the harvester. Such installation procedures have sometimes made use of a long pipe or like member attached to the rotary chopper element along its axis to support the rotary member as it was being moved through the access and installation window to its desired installation position. On occasion, because of the difficulties implicit with such installation activities and the limitations of the various suspension or support elements employed, damage to the rotary chopper element resulted.

In light of the difficulties that have been experienced in installing and setting up the rotary chopper elements, and the lost time and frustration that has usually accompanied such activities, an insertion tool has now been developed that allows users to more easily, quickly, and safely install the rotary chopper element in an integral chopper assembly.

SUMMARY OF THE INVENTION

What has been developed and is disclosed herein is an insertion tool for installing rotary chopper elements in integral chopper assemblies in combine harvesters, which insertion tool includes an elongated open-ended trough-like bed portion of a length, breadth, and depth to sufficiently accommodate the rotary chopper element therewithin, with lift brackets along the sides thereof configured to accommodate the prongs of lifting forks of a forklift. The rotary chopper element may be positioned to rest within the bed portion of the insertion tool for transport to adjacent to the access and installation window and for insertion thereby through such window for installation within the harvester.

In one preferred embodiment, the bed portion of the insertion tool includes an underlying pan portion formed to generally define an open-ended trough having a leading end, intended to be oriented towards the access and installation window during installation activities, with a slidable insert or slip plate resting upon and generally conforming to the shape of the inner surface of the pan portion. The slip plate is dimensioned to generally conformably fit within the pan portion, to be slidable relative to the pan portion upon which it rests, and to preferably include a pair of upstanding tab portions at or near the leading end of the slip plate against which tab portions knife blades near the leading end of the rotary chopper element may be positioned. The lift brackets include a pair of aligned, open-ended box brackets along the opposite sides of the bed portion, generally located within approximately the trailing half of the insertion tool, which pair of box brackets are dimensioned to accommodate therein, and projecting therethrough, a prong of a lifting fork of a forklift.

Positioning or guide plates are preferably secured to the sides of the pan portion at or near the leading end thereof to facilitate side-to-side alignment of the installation tool and the rotary chopper element supported thereon with the access and installation window as the insertion tool and supported rotary chopper element are positioned at the access and installation window.

Also, preferably, the box brackets will include mounting apertures through sides thereof to permit the box brackets to be secured to the prongs of the lifting forks extending through such box brackets during installation or removal operations.

With the preferred embodiment, when the insertion tool is properly positioned adjacent to the access and installation door in a proper alignment therewith for delivery of the supported rotary chopper element to its installation location, the slip plate, with the rotary chopper element thereon, is slidably extensible from the leading end of the pan portion to position the rotary chopper element within the harvester for installation, and, once the rotary chopper element has been at least loosely mounted in the harvester, to be slidably withdrawn through the access and installation window.

DETAILED DESCRIPTION OF THE INVENTION

Figure 1:
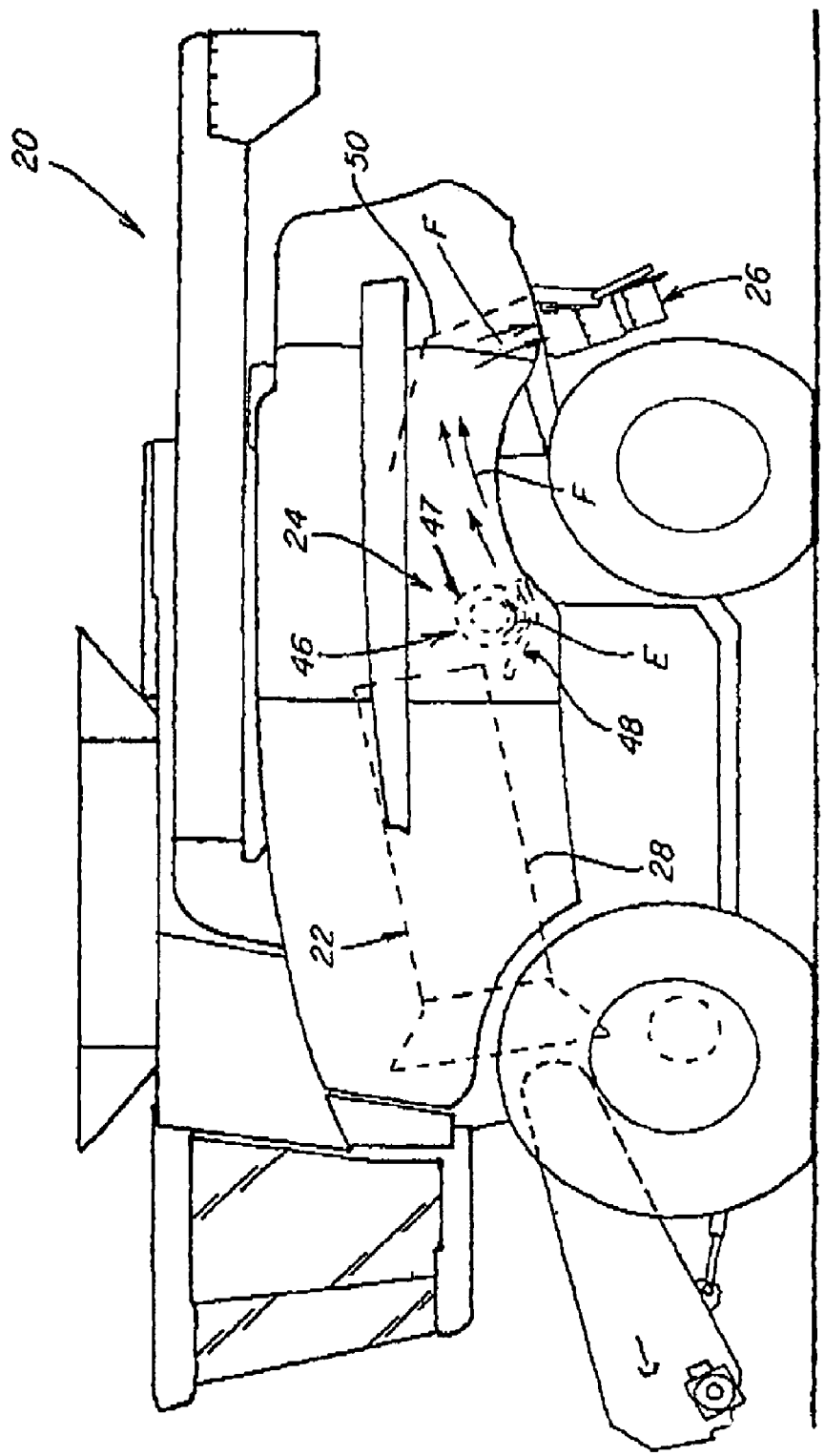
FIG. 1 is a simplified side plan view, from the left side, of an agricultural combine, illustrating, in dotted outline, an axially arranged threshing system of the combine and an integral chopper assembly of the residue treatment and distribution system.
Figure 2:
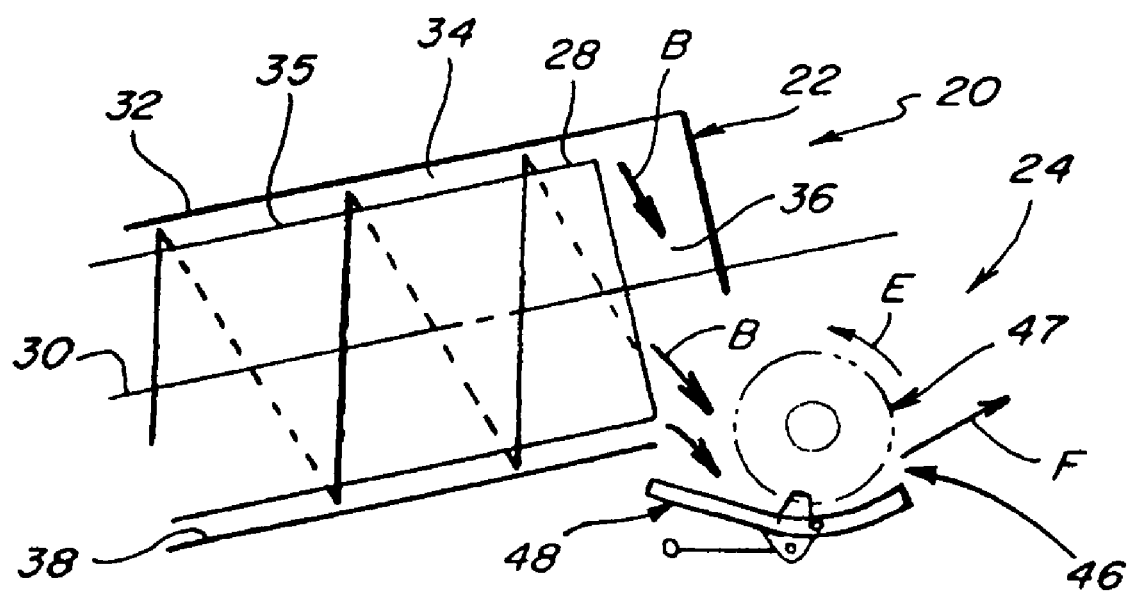
FIG. 2 is a simplified side plan view, from the left side, of the threshing system and a portion of the crop residue treatment and distribution system of the combine of FIG. 1, further illustrating the flow of crop residue to and through the integral chopper assembly.

Referring now to the drawings, wherein certain elements and features may be labeled or marked on a representative basis without each like element or feature necessarily being individually shown, labeled, or marked, and wherein certain elements may be labeled and marked in only some, but not all, of the drawing figures, FIGS. 1 and 2 depict a representative agricultural combine 20 that includes a longitudinally axially arranged threshing system 22 and a crop residue treatment and distribution system 24 with a crop residue spreader 26, all of which may be of known construction and operation.

As can be generally and essentially observed from a review and study of FIGS. 1-2, threshing system 22 is axially arranged in that it includes a cylindrical threshing rotor 28 conventionally supported and rotatable in a predetermined, typically clockwise direction, about a rotational axis 30 therethrough and within a concave 32 (FIG. 2), for conveying a flow of crop material in a helical flow path through a space 34 extending circumferentially around an outer cylindrical surface 35 of rotor 28 and an inner circumferential surface 38 of concave 32. As the crop material is moved through space 34, the crop, such as grain, legumes, or the like, will be loosened and separated from crop residue such as husk and pods, and carried away therefrom in the well known conventional manner.

As may be best illustrated by FIG. 2, the crop residue will continue along a helical path through space 34, and will be expelled therefrom, as denoted by arrows B, into and through a discharge opening and passage 36, which essentially comprises an extension of space 34 at the downstream end of threshing rotor 28. The consistency of the flow of crop residue, volume thereof, and extent or pattern thereof, will typically vary, and be a function of a variety of conditions, including, but not limited to, the speed of rotation of rotor 28, crop type, plant maturity, moisture content, and weather conditions. As an example, rotor speeds can vary between just a few hundred RPM and over 1000 RPM. Wheat and other small grains will typically have relatively small crop residue components, whereas other grains, such as corn, will typically have larger components, such as thick stalk segments, cob fragments, and large leaves.

Crop residue treatment and distribution system 24 will typically include a transport and chopping assembly, such as integral chopper assembly 46, sometimes hereinafter referred to as rotary assembly 46, having a rotary chopper element 47 rotatable in a direction E above a concave pan assembly such as chopper grate assembly 48. Rotary chopper element 47 typically rotates at a rapid speed, so as to be capable of accelerating and propelling a flow of crop residue rearwardly within the confines of the rear end of combine 20, as generally denoted by arrows F. Such rearward flow is typically guided and directed by internal panels or shields, generally denoted by shields 50 (FIG. 1), so as to either flow through a rear opening so as to be deposited directly onto a field, such as in a windrow, or flow into a secondary crop residue chopper and/or spreader, such as chopper/spreader 26, for spreading thereby in a swath on the field.

In the further discussion of these and other drawings and the elements shown therein, it should be understood and appreciated that, for purposes of clarity in various of such drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Figure 3:
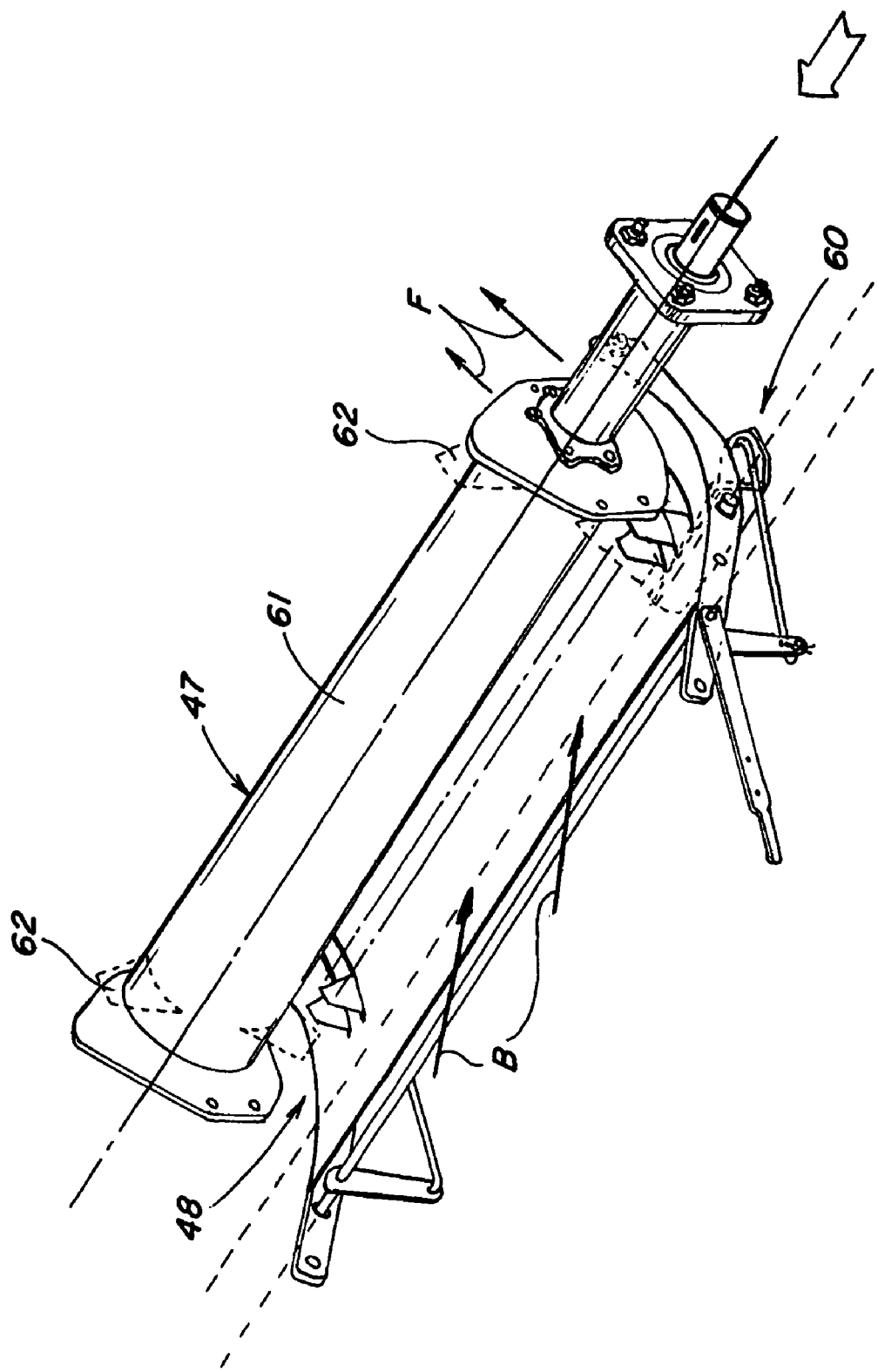
FIG. 3 is a perspective view, from the left front side of an integral chopper assembly such as that of FIGS. 1 and 2, wherein, for purposes of clarity, knife blades on the rotary chopper element of the integral chopper assembly are shown in dotted outline only and phantom lines along the central portions of the rotary chopper element and the grate assembly should be considered to include therealong various components, representative components of which are depicted to the outer sides thereof.

With such thoughts in mind, FIG. 3 depicts generally a portion of an integral chopper assembly 46 that includes a rotary chopper portion or element 47 that extends generally horizontally across the flow path of the crop residue above a chopper grate assembly 48 that includes as a portion thereof the counter knife assembly 60. The rotary chopper element 47 includes a cylindrical element or like rotary member 61, and has a number of paddles or knife blades 62, with only several representative knife blades being individually depicted in FIG. 3, mounted or affixed thereto at a plurality of mounting locations distributed about its periphery. The particular positionings, arrangements, and configurations of such plurality of paddles or knife blades 62, which may take many forms and variations, are not considered to be critical to the present invention or its practice.

Figure 4:
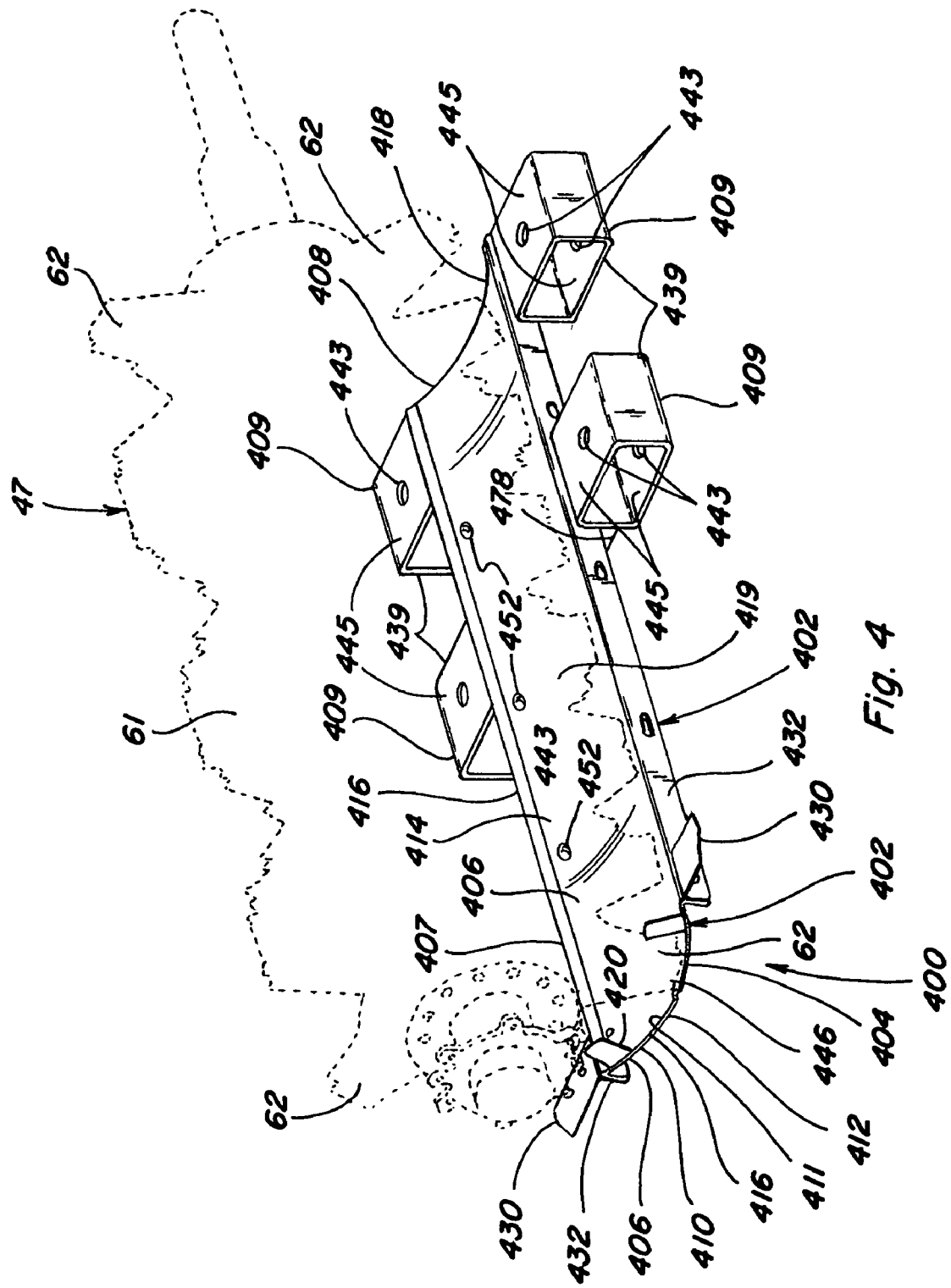
FIG. 4 is a perspective view from the upper front of a preferred insertion tool embodiment.
Figure 5:
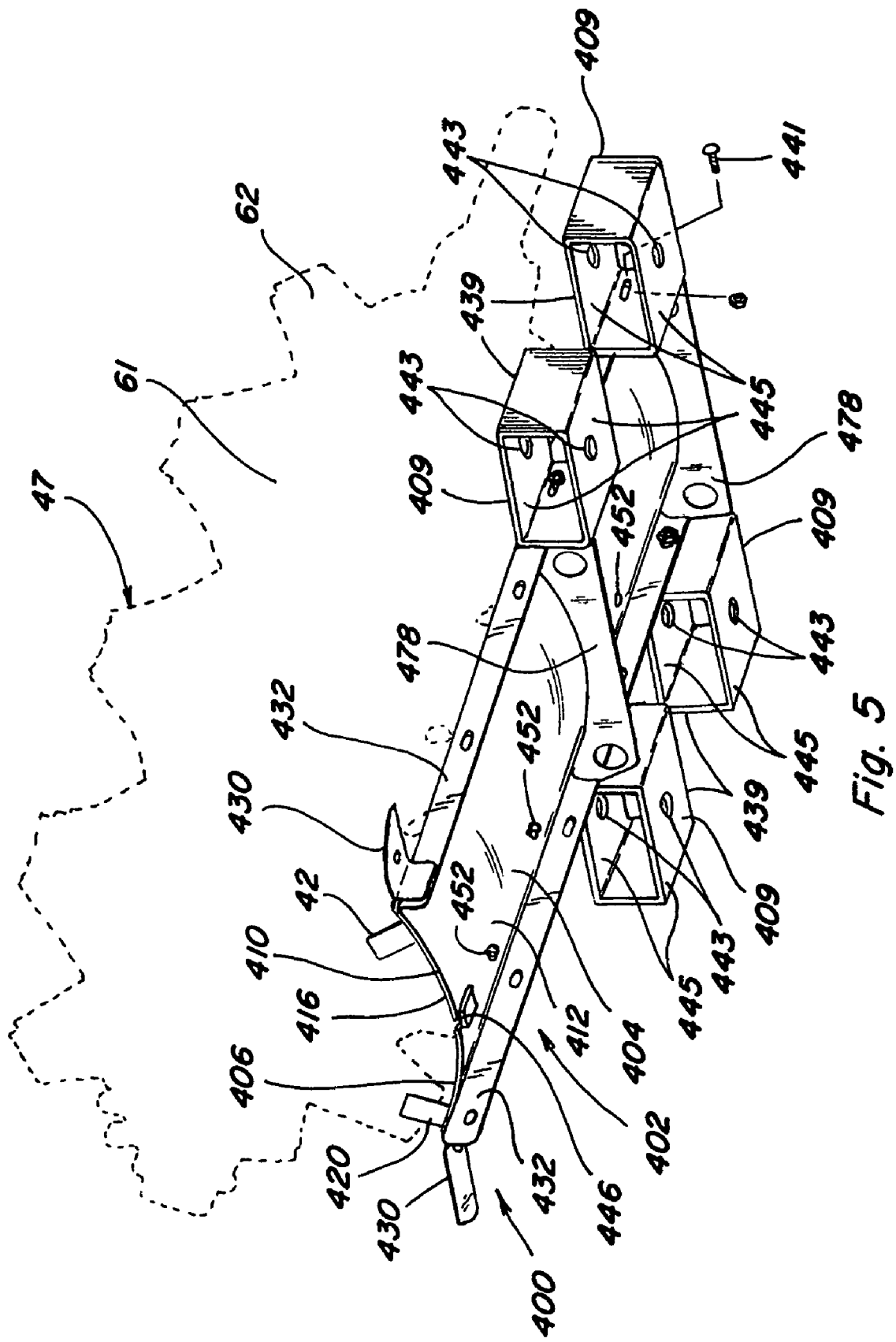
FIG. 5 is a perspective view from the lower front of the preferred insertion tool embodiment of FIG. 4.

As has been noted previously hereinabove, rotary chopper elements are typically heavy and cumbersome, and difficult and dangerous to handle when a plurality of knife blades have been mounted therealong and therearound. FIGS. 4 and 5 depict in dotted outline a typical rotary chopper element 47 in association with an insertion tool 400 according to the present invention. Such insertion tool 400 includes an elongated open-ended trough-like bed portion 402 that has an underlying pan portion 404 with a slip plate 406 resting upon and generally conforming to the shape of the upper surface 407 of pan portion 404, and lift brackets 409 secured to the pan portion 404 to accommodate therein the prongs of lifting forks of a forklift.

In such preferred embodiment, the pan portion 404, which has a generally arcuate cross-section and is so formed to generally define an open-ended trough, has a leading end 410, intended to be oriented towards the access and installation window during installation activities, a trailing end 408, and inner and outer surfaces 411 and 412, with a slidable insert or slip plate 414 resting upon and generally conforming to the shape of the inner surface 411 of the pan portion 404. Such pan portion 404 may be formed of any suitable material, such as a metal sheet or plate 416 formed to have a radius of curvature preferably slighter greater than the radius of curvature of the rotary chopper element 47 that is to be supported. Thus, for a rotary member 61 with knife blades 62 installed thereabout where the radius to the tip of the knife blades 62 is approximately 250 mm., which is somewhat typical of some current rotary chopper elements, the radius of curvature of the pan plate 416 might be selected to be, for example, 270±10 mm.

The slip plate 414, which is formed of a suitable material to be slidable relative to the pan portion 404, such as a similar metal plate, especially if a grease coating is applied between the pan portion 404 and the slip plate 414, is dimensioned to generally conformably fit within the pan portion 404 and to generally extend between a leading end 416 and trailing end 418 and to form a channel 419 therebetween. Such slip plate 414 preferably includes a pair of upstanding tab portions 420 at or near the leading end 416 of the slip plate 414 against which tab portions 420 knife blades 62 near the leading end 422 of the rotary chopper element 47 may be positioned to prevent the rotary chopper element 47, when supported upon the slip plate 414 within the pan portion 404, from sliding beyond the leading end 416 of the slip plate 414.

In addition, and preferably, a pair of positioning or guide plates 430 may be secured to the opposite sides 432 of the pan portion 404, which sides 432 are depicted in FIGS. 4-5 as including depending side flanges running the length of the pan portion 404, at or near the leading end 410 of pan portion 404 to facilitate side-to-side alignment of the installation tool 400 and the rotary chopper element 47 supported thereon with the access and installation window as the insertion tool 400 and supported rotary chopper element 47 are positioned at the access and installation window. The guide plates 430 are preferably sized such that the distance between the outer or distal ends of such guide plates 430 is slightly less than the dimension of the access and installation window, such as with approximately a ⅛ inch clearance between the distal ends of such guide plates 430 and the sides of the access and installation window, so that the guide plates 430 can be positioned to properly orient the supported rotary chopper element 47 for insertion through the access and installation window.

In such embodiment, the lift brackets 409 include a pair of aligned, open-ended box brackets 439 along the opposite sides 432 of the pan portion 404, generally located within approximately the trailing half of the insertion tool 400, which pairs of box brackets 419 are dimensioned to accommodate therein, and projecting therethrough, a prong of a lifting fork of a forklift. The box brackets 439 may be secured to the pan portion 404 in any suitable manner, including by welding or by other suitable connector constructions, such as carriage bolt and nut connections 441 (FIG. 5). Preferably, such box brackets 439 will include mounting apertures 443 through sides 445 thereof to permit the box brackets 439 to be secured to the prongs of the lifting forks extending through such box brackets 439 during installation or removal operations.

Preferably, similarly sized alignment notches 446 may be formed in the pan portion 404 and in the slip plate 414, near the leading ends 410 and 416 thereof, to permit the proper side-to-side alignment of the slip plate 414 within the pan portion 404, prior to placement of the rotary chopper element 47 on the slip plate 414.

Figure 6:
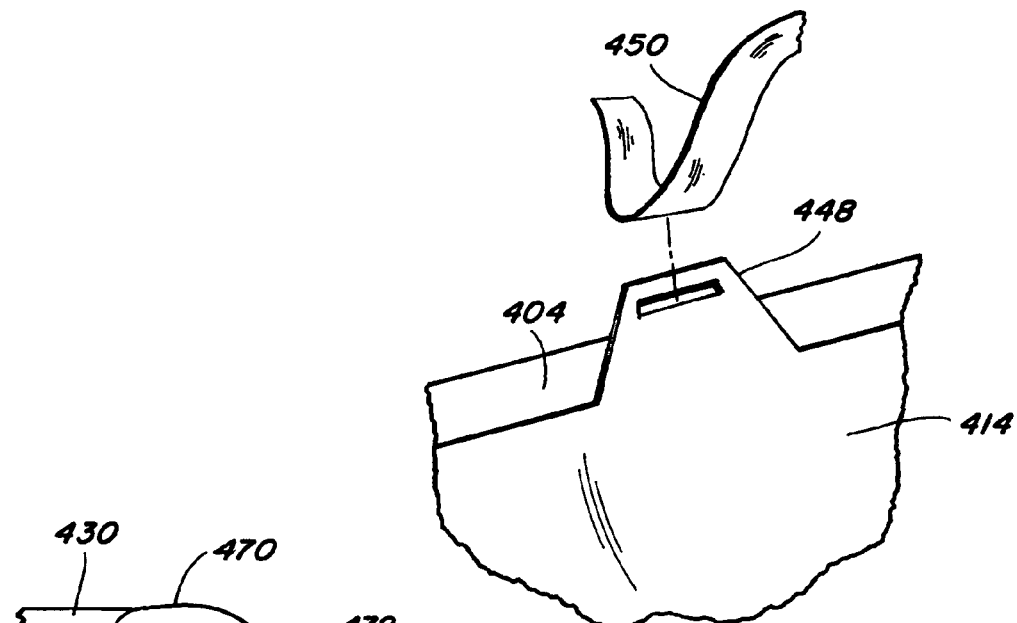
FIG. 6 is a perspective view of a portion of one side of an insertion tool embodiment depicting a slip plate thereof with a strap connector formed along the side of the slip plate.

In addition, in some embodiments, as better shown in FIG. 6, the slip plate 414 may include slots or fastening positions or clips 448 at spaced locations along its length for associated strap members 450 that are employed to strap the rotary chopper element to the slip plate 414 when the rotary chopper element has been rested thereon to more stably secure the rotary chopper element to the slip plate 414 during installation or removal procedures.

To effect installation of a rotary chopper element 47 into a harvester, the slip plate 414 is positioned and properly aligned within the pan portion 404, such as by aligning the alignment notches 446 of the slip plate 414 and the pan portion 404. The rotary chopper element 47 may then, while outside the harvester, be placed to rest on the slip plate 414 within the pan portion 404 of the insertion tool 400, with knife blades 62 near the leading end 422 of the rotary chopper element 47 positioned against the tab portions 420 of the slip plate 414. Preferably, the slip plate 414, with the rotary chopper element 47 thereon, will then be secured to the pan portion 404, such as by nut and bolt connections through registrable mounting apertures 452 (FIGS. 4 and 5), and, if mounting straps and strap connectors are provided with the particular embodiment employed, the rotary chopper element 47 may also be strapped in place on the slip plate 414.

When the prong of a lifting fork has been inserted to extend through a pair of aligned box brackets 439, the box brackets 439 may, if so desired by the user, be secured to such prong to better ensure that the pan portion 404 will remain stably engaged with the forklift during installation procedures. The lifting fork of the forklift may be raised to lift the insertion tool 400 and the rotary chopper element 47 therewithin to an appropriate height and the forklift may be operated to move the insertion tool 400 and the rotary chopper element 47 therewithin to adjacent the access and installation window, with the guide plates 430 being utilized to properly align the rotary chopper element 47 with the access and installation window for insertion therethrough.

Preferably, at least a portion of the insertion tool 400 may be movable through the access and installation window to extend into the interior of the harvester, with the rotary chopper element 47 still supported thereby. The slip plate 414 may be unsecured from the pan portion 404 to permit the slip plate 414, with the rotary chopper element 47 resting thereupon, to then be slid forwardly to move the slip plate 414 and the rotary chopper element 47 fully into the harvester so that the rotary chopper element 47 can be properly mounted within the harvester. If the rotary chopper element 47 had been strapped to the slip plate 414, such straps may, according to the desires of the user, be unstrapped either prior to or after sliding the slip plate 414 into the harvester.

When the rotary chopper element 47 has been at least loosely installed in place, with the rotary chopper element 47 unstrapped from the slip plate 414, the slip plate 414 may then be slidably withdrawn from the interior of the harvester, leaving the rotary chopper element 47 in position within the harvester. The forklift may be operated to fully withdraw the insertion tool 400 away from harvester and to deposit the tool at an appropriate location.

Removal of a rotary chopper element 47 may be performed by generally reversing such procedure.

Figure 7:
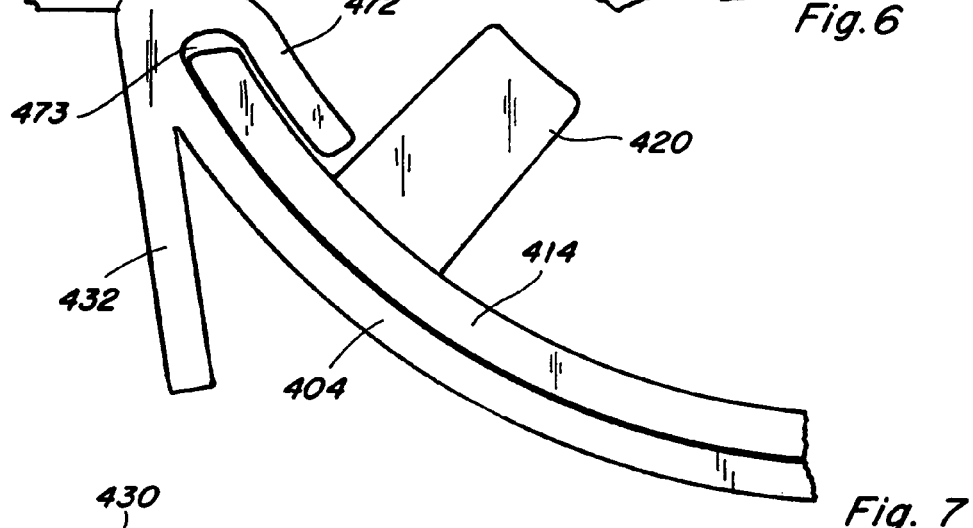
FIG. 7 is a somewhat generalized end view of a portion of an insertion tool embodiment that has a slide guide feature associated with the pan portion thereof.
Figure 8:
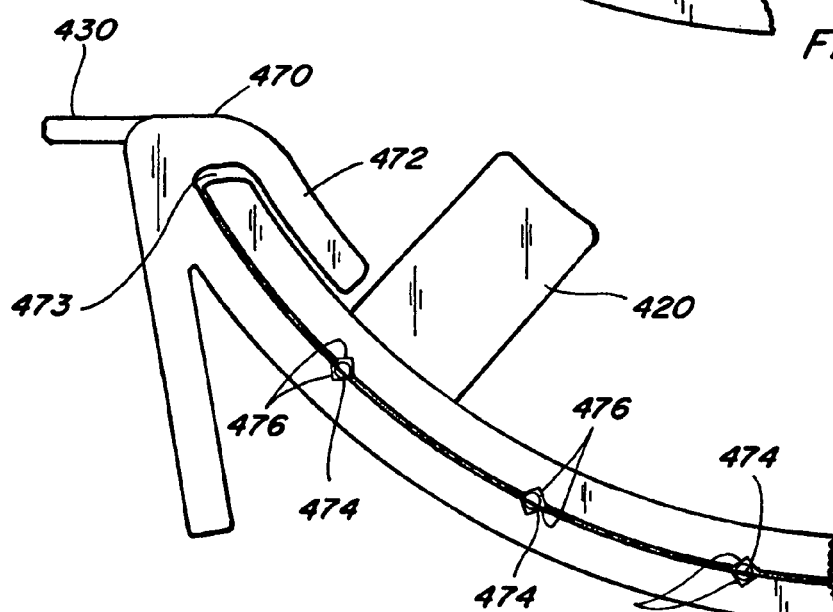
FIG. 8 is a somewhat generalized end view of an insertion tool embodiment, similar to that of FIG. 7 but wherein the insertion tool also employs rolling members to facilitate the sliding movement between the slip plate and the pan portion.

With some embodiments, slide guide features may be employed along the pan portion 404 to facilitate sliding movement of the slip plate 414 relative to the pan portion 404 while also minimizing torquing action of the slip plate 414 relative to the pan portion 404 as the slip plate 414 is slidably extended beyond the leading end 410 of the pan portion 404. In such regard, as depicted in FIG. 7, pan portion 404 may, by way of example and not of limitation, be configured to have a slide guide shoulder portion 470 with a flange portion 472 that overlays side portions of the slip plate 414, to define a slide channel 473 within which a side portion of the slip plate rides, and which acts not only to guide the sliding movement of slip plate 414 but also, as the slip plate is extended forwardly, the maintain the trailing end 418 (FIG. 4) in contact with or close proximity to the upper surface 408 of pan portion 404. In addition, as may be further observed from FIG. 8, in some embodiments rolling members, such as ball bearings or other like members 474, may be positioned within pockets and/or grooves 476 in the abutting surfaces of the slip plate 414 and the pan portion 404 to facilitate sliding movement therebetween.

To provide additional body and strength to the insertion tool 400, strengthening members, such as rib members 478, as best shown in FIG. 5, may be advantageously utilized, and connected to the pan portion 404 in any suitable manner. Such rib members 478 help to prevent deformation of the insertion tool, especially twisting deformation, such as could occur in the event of an uneven loading of the insertion tool at any point in its use.

Although the foregoing discussions have been presented with particular reference to integral chopper assemblies, it should be understood and appreciated that the present invention is not intended to be and should not be considered to be limited to use or practice in or with integral chopper systems. It should be recognized that the present invention may well also find application and be advantageously employed and practiced in various other types of chopper systems, including, by way of example only and not of limitation, hood mount chopper systems. Accordingly references in the claims which follow to chopper assemblies or chopper systems are intended to be broadly treated and not limited to integral chopper assemblies or systems.

In light of all the foregoing, it should thus be apparent to those skilled in the art that there has been shown and described an insertion tool for a rotary chopper element of an integral chopper assembly that provides the various advantages sought therefor. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the integral chopper assembly and of the invention that forms a part thereof, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. An insertion tool for a rotary chopper element for a chopper assembly of a combine harvester, which harvester includes an access and installation window in the side thereof through which a rotary chopper element can be inserted for installation within the harvester, which rotary chopper element includes knife blades mounted thereon, said insertion tool comprising
    an elongated open-ended bed portion with opposed sides extending from a leading end of said bed portion to a trailing end of said bed portion, upon which bed portion the rotary chopper element may rest, and
    lift members positioned along the sides of said bed portion and configured to accommodate prongs of lifting forks of a forklift, said bed portion configured to receive and to support therein a rotary chopper element as said insertion tool and a supported rotary chopper element are moved to position the rotary chopper element adjacent to the access and installation window for installation into the harvester, wherein said bed portion includes an underlying pan portion having leading and trailing ends and an upper surface, and a slip plate positionable upon said upper surface of said pan portion and slidably movable therealonq, wherein said slip plate includes near a leading end a pair of upstanding tab portions against which knife blades of the rotary chopper assembly are positionable when the rotary chopper element is positioned to rest upon said insertion tool,
    said installation tool operable to slidably move the rotary chopper element through the access and installation window to position the rotary chopper element within the harvester for mounting thereto.

2. The installation tool of claim 1 wherein said pan portion has the form of an open-ended trough.

3. The installation tool of claim 2 wherein said pan portion includes a plate-like portion, which has an upper surface, extending between said leading and trailing ends of said pan portion, said plate like portion having a radius of curvature greater than or equal to the radius of curvature of the rotary chopper element.

4. The installation tool of claim 3 wherein said slip plate conforms generally to said upper surface of said plate-like portion of said pan portion.

5. The installation tool of claim 4 said slip plate has a radius of curvature greater than or equal to the radius of curvature of the rotary chopper element.

6. The installation tool of claim 1 wherein said slip plate is slidably extensible relative to said pan portion to beyond said leading end of said pan portion.

7. The installation tool of claim 6 wherein said pan portion includes therewith a slide guide along at least a portion thereof to guide the slidable movement of said slip plate relative to said pan portion.

8. The installation tool of claim 7 wherein said slide guide minimizes torquing of said slip plate relative to said pan portion as said slip plate is slidably extended relative to said pan portion to beyond said leading end of said pan portion.

9. The installation tool of claim 8 wherein said slide guide includes flange portions along the sides of said plate-like portion defining slide channels within which the sides of said slip plate ride as said slip plate slidably moves relative to said pan portion.

10. The insertion tool of claim 9 including rolling members insertable between said pan portion and said slip plate on which said slip plate rides as it is slidably moved relative to said pan portion.

11. The insertion tool of claim 10 wherein one of said pan portion and slip plate includes pockets therein for retaining said rolling members and the other of said pan portion and slip plate includes extended grooves along which said rolling members ride as said slip plate is slidably moved relative to said pan portion.

12. The installation of claim 1 wherein said slip plate is securable to said pan portion when a rotary chopper element has been positioned to rest upon said slip plate for transport and to prevent slidable movement between said slip plate and said pan portion during such transport.

13. The installation tool of claim 1 wherein said pan portion includes a plate-like central portion between two opposed sides, said central portion having a generally concave cross-section, said pan portion including a pair of generally sidewardly projecting guide plates extending to distal ends thereof, the distance between the distal ends of said guide plates being slightly less than the width of the access and installation window of the harvester.

14. The installation tool of claim 1 wherein said slip plate includes at least one strap mounting portion that may be employed to strap the rotary chopper element to said slip plate during transport and positioning of a supported rotary chopper element for installation within the harvester.

15. The installation tool of claim 1 wherein said lift members are secured to said pan portion.

16. The installation tool of claim 15 wherein said lift members are located along approximately the trailing half of said pan portion.

17. The installation tool of claim 15 wherein said lift members are securable to the prongs of the lifting forks of the forklift.

18. The installation tool of claim 17 wherein
    said pan portion includes opposed sides,
    said lift members include pairs of aligned box brackets along said sides of said pan portion,
    each said pair of aligned box brackets configured to receive therein and to have projecting therethrough a prong of the lifting fork of the forklift, said box brackets including sides thereof with mounting holes therethrough for connection members to be received therein to connect to the prong of the lifting fork of the forklift.

19. A method for positioning, with the aid of a forklift having a lifting fork with at least one prong thereon, a rotary chopper element for a chopper assembly of a combine harvester within the harvester, which harvester includes an access and installation window in the side thereof through which a rotary chopper element can be inserted for installation within the harvester and which rotary chopper element includes knife blades mounted thereon, said method comprising provinding an insertion tool for such rotary chopper element, said insertion tool including an elongated open-ended bed portion configured to receive and to support therein a rotary chopper element, and at least one lift member positioned along said bed portion and configured to accommodate the prong of the lifting fork of the forklift, said bed portion including an underlying pan portion having leading and trailing ends and an upper surface, and a slip plate positionable upon said upper surface of said pan portion and slidably movable therealong, ensuring said slip plate is generally positioned to be approximately centered relative to the leading and trailing ends of said pan portion, positioning the rotary chopper assembly to rest upon said slip plate, ensuring the positioning of the prong of the lifting fork of the forklift in engagement with said lift member and effecting the lifting of the insertion tool and the rotary chopper assembly positioned upon said slip plate thereof, such combination forming a forklift load, to a desired elevation, moving said forklift and said forklift load to a desired location generally adjacent to the access and installation window of the harvester, with the leading end of said bed portion directed generally towards the access and installation window, aligning said forklift load with the access and installation window for insertion of the slip plate and rotary chopper element positioned and resting thereupon through the access and installation window, slidably extending said slip plate, with the rotary chopper element positioned and resting thereon, relative to said pan portion to extend beyond said leading end of said pan portion and through the access and installation window into the harvester, mounting, at least loosely, the rotary chopper element to the harvester, slidably retracting said slip plate towards said pan portion to withdraw said slip plate from beneath the mounted rotary chopper element and through the access and installation window.

20. The method of claim 19 wherein the step of positioning the rotary chopper assembly to rest upon said slip plate includes securably connecting said slip plate to said pan portion to substantially prevent sliding movement therebetween as the rotary chopper element is transported.

21. The method of claim 20 wherein the step of slidably extending said slip plate, with the rotary chopper element positioned and resting thereon, relative to said pan portion to extend beyond said leading end of said pan portion and through the access and installation window into the harvester includes disconnecting said slip plate from said pan portion to allow sliding movement therebetween.

22. The method of claim 19 wherein the step of ensuring the positioning of the prong of the lifting fork of the forklift in engagement with lift members and effecting the lifting of the insertion tool and the rotary chopper assembly positioned upon said slip plate thereof includes securing said lift member to the prong of the lifting fork.

23. The method of claim 19 wherein said slip plate portion includes a tab portion near a leading end, and the step of positioning the rotary chopper assembly to rest upon said slip plate includes positioning a knife blade of the rotary chopper assembly against said tab portion.

* * * * *